Patented Aug. 10, 1943

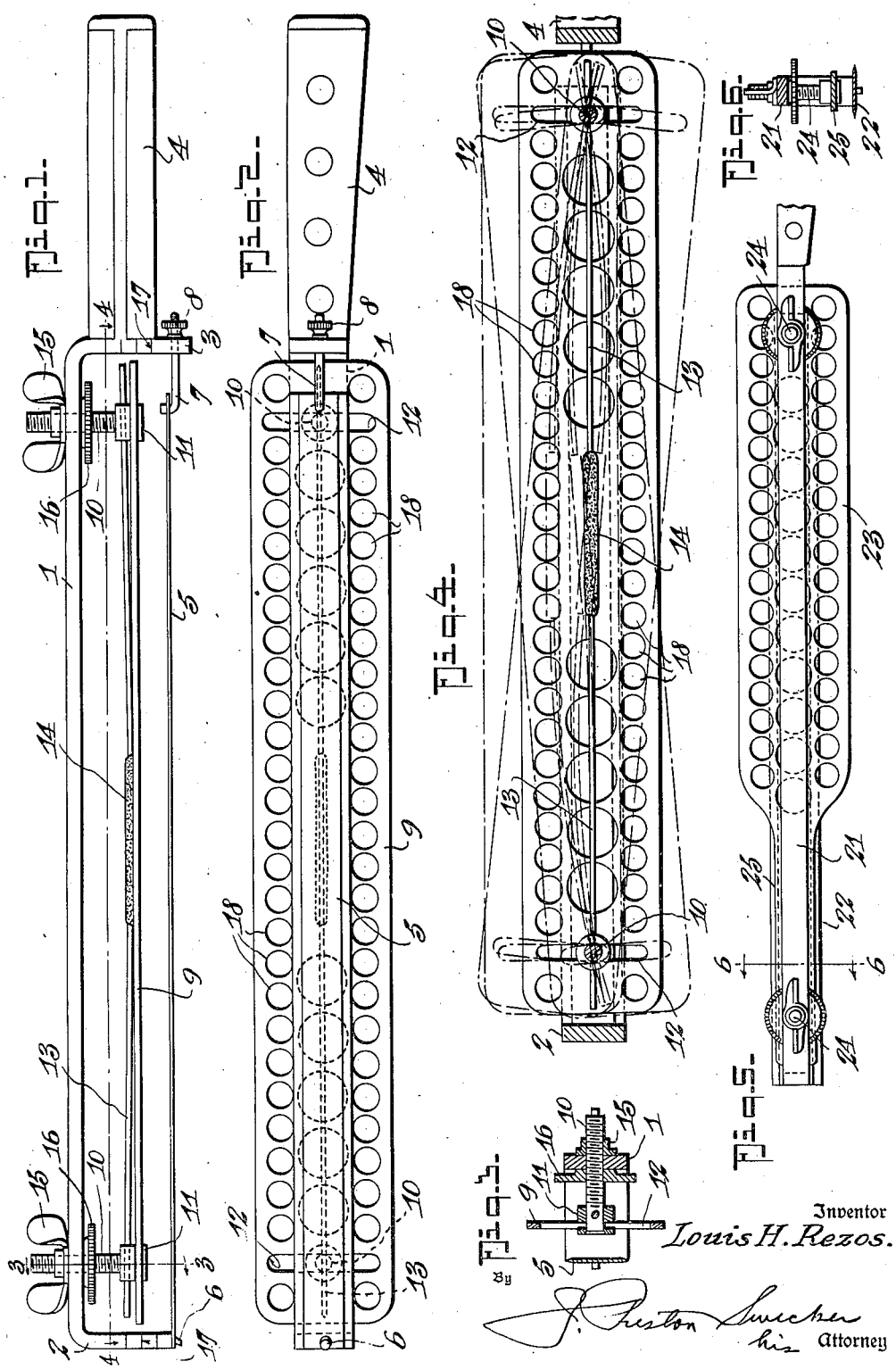
Aug. 10, 1943.  L. H. REZOS  2,326,563
ADJUSTABLE SLICING KNIFE
Filed Oct. 8, 1940
Inventor
Louis H. Rezos.

2,326,563

UNITED STATES PATENT OFFICE 2,326,563

ADJUSTABLE SLICING KNIFE

Louis H. Rezos, Arlington, Va.

Application October 8, 1940, Serial No. 360,327

4 Claims. (Cl. 30—283)

This invention relates to an improvement in adjustable slicing knives adapted for the slicing of meat or other articles of food.

The slicing of meat or the like requires great skill in gauging the desired thickness of the slice so as to obtain uniform slices of the desired thickness, and this is not possible by untrained persons who are often called upon to produce such slices. Even with the utmost skill, the slices are not always uniform, especially when it may be desired to vary the thickness under different conditions.

The object of this invention is to provide for the production of a uniform thickness of slice which is adjustable to different degrees under the control of the operator, which is accomplished by the provision of an adjustable guard associated with the slicing blade and extending lengthwise thereof to regulate the thickness of the slice and to insure that the slice may be formed uniformly.

Another object of the invention is to improve the construction of the slicing knife by the provision of a double edged blade which is mounted under tension, so as to insure of positive accurate slicing thereby; by providing such perforations in the guard that the edges of the blade being manipulated therebelow will be readily visible to the operator; and by constructing the guard, so as to expose an edge of the blade beyond the guard, at least at one end thereof, whereby the guard will not interfere with the slicing action of the blade when cutting against a solid object, such as a bone in a piece of meat.

These features are provided in different embodiments of the invention which are illustrated in the accompanying drawing, in which:

Fig. 1 is a side elevation of one form of the adjustable slicing knife;

Fig. 2 is a bottom plan view thereof;

Fig. 3 is a cross section therethrough on the line 3—3 of Fig. 1;

Fig. 4 is a longitudinal sectional view thereof on the line 4—4 of Fig. 1;

Fig. 5 is a top plan view of a modified form of knife; and

Fig. 6 is a cross section thereof on the line 6—6 of Fig. 5.

Referring to the form of the invention shown in Figs. 1 to 4, the knife is constructed of an elongated frame 1, which constitutes a back, and which is provided with down-turned arms 2 and 3 at opposite ends thereof, cooperating with the back 1 to provide a substantially U-shaped frame. The arm 3 is shown as having a handle 4, extending outwardly therefrom adapted to be grasped by the operator for manipulating the knife.

A knife blade is shown at 5, which extends lengthwise of the back 1 and parallel therewith, which blade is somewhat flexible and relatively thin, but is sharpened at both opposite edges as shown in Figs. 2 and 3, preferably being constructed of steel or other metal of good quality for the purpose. The opposite ends of the blade 5 are provided with perforations therein, one of which engages a pin 6, projecting from the end of the arm 2, which pin is shown as having a slightly lateral bend to hold the blade in place thereon, so as to anchor said end of the blade. The opposite end of the blade 5 is engaged by a J-bolt 7, the shank of which extends through the arm 3 and receives a nut 8, threaded thereon for adjusting said bolt to vary the tension of the blade, which nut may be removed also for removal of the blade when desired for cleaning, sharpening or otherwise. It will be evident that when the J-bolt is removed from the arm 3, or loosened sufficiently to disconnect the adjacent end of the blade 5 therefrom, that the blade may be detached readily from the pin 6 for sharpening, cleaning, or the substitution of a new blade, as may be desired.

Associated with the blade 5 and extending lengthwise thereof in parallel spaced relation therewith, is a guard 9 which is shown in Fig. 2, as of somewhat greater width than the blade 5 to extend outwardly beyond the edges thereof on both sides. The guard 9 is supported by bolts 10 adjacent opposite ends thereof, which bolts have grooved heads 11, received in transverse slots 12 formed in the opposite end portions of the guard 9 for freedom of transverse sliding movement of the guard 9 relative to the bolts 10. Such sliding movement is opposed by a leaf spring 13 formed of spring wire, the opposite ends of which extend through the heads 11 of the bolts, and the intermediate portion of said leaf spring 13 is anchored at 14 by soldering, welding, or the like, to the back of the guard 9, whereby transverse movement of the guard will be opposed by said spring which will also have a tendency to return the guard to its intermediate position. The guard 9 may be adjusted toward and from the blade 5 by adjustable winged nuts 15 threaded on the bolts 10 and may be held in an adjusted position by lock nuts 16 threaded thereon, which nuts 15 and 16 cooperate with the back 1 to support the guard therefrom. The extent of adjustment of opposite end portions of the guard 9 may be indicated by graduations 17 provided on the arms 2 and 3 to insure that both end portions may be adjusted to the same extent and that the guard will be disposed parallel with the blade 5 for obtaining slices of uniform thickness. Since the slicing operation is usually accomplished in a horizontal direction with the blade on the underside of the back 1, the guard 9 is provided with a multiplicity of perforations 18 therein, as shown in Figs. 2 and 4 to provide for full visibility of the edges of the blade by the operator for certainty of slicing operation, so that he may see the portion of the meat or other product that is being sliced.

The manner of use of the knife will be evident to accomplish the desired slicing operation, but the operator may adjust the thickness of the slice by varying the position of the guard 9 relative to the blade 5. This is done by first loosening the lock nuts 16 and then turning the nuts 15 to move the guard 9 toward or from the blade 5, as may be desired, the same adjustment being made at each end of the guard, as indicated by the graduations 17.

After thus adjusting the guard 9, the lock nuts 16 are retightened, and the slicing operation may proceed in the usual way. Where a piece of meat is being sliced as it rests on a support or holder, the slicing operation is usually in a horizontal direction, when the perforations 18 afford full visibility at the point of slicing, so that the operator may see what is being cut. The guard 9 is placed against the face of the piece of meat or other object overlapping the face while the blade engages the edge thereof, thereby regulating the thickness of the slice to be cut.

While the guard 9 preferably extends outward beyond the lateral edges of the blade to regulate the thickness of the slice, this would normally interfere with the slicing operation at or adjacent a bone or other solid object, but the mounting of the guard 9 provides for the bodily movement thereof relative to the blade, as indicated in dotted lines in Fig. 4, when said guard contacts the bone or other solid object so as to permit the blade to continue its slicing movement directly thereto. This is permitted by reason of the transverse slots 12 in the guard which are slidably connected with the heads 11 of the bolts 10 whereby the opposite ends of the guard may slide transversely relative to the bolts either parallel with the blade 5 or at an angle thereto when pressed against the bone or other solid object, to permit the continued movement of the blade through the meat or other product directly thereto.

In the modified form shown in Figs. 5 and 6, the frame 21 carries a blade 22 connected therewith substantially as described above, but the blade is shown as of somewhat greater width than the frame. A guard 23 is supported from the frame by bolts 24 which are connected rigidly with the opposite end portions of the guard 23 for adjustment of said guard toward and from the blade 22, but the guard is held against transverse sliding movement relative thereto. To provide for the access of the blade 22 to the bone or other solid object to accomplish the slicing movement directly thereto, one end portion of the guard 23 is reduced in width to form a relatively narrow neck 25 of less width than the blade 22, leaving the opposite edges of the blade exposed while the major portion of the guard 23 overlaps the edges of the blade to form a guard therefor and to regulate the thickness of the slice in the manner desired above. This form is used in the same way as the form shown in Figs. 1 to 4 and may be adjusted to vary the thickness of the slice as described.

I claim:

1. A slicing knife comprising an elongated frame having longitudinally spaced inturned arms, a blade extending lengthwise of the frame between the arms and supported thereby, said blade having opposite cutting edges, a guard of greater width than the blade and extending laterally outside the cutting edges of the blade substantially parallel therewith, bolts connected with opposite end portions of the guard and adjustably connected with the frame for supporting the guard therefrom and for bodily adjusting said guard toward and from the blade, said guard having transverse slots therein slidably connected with the bolts for transverse sliding movement of the guard relative to the blade, and a leaf spring connected between the bolts and the guard tending to move said guard to a central position relative to the blade.

2. A slicing knife comprising an elongated frame having longitudinally spaced inturned arms, a blade extending lengthwise of the frame between the arms and supported thereby, said blade having opposite cutting edges, a guard of greater width than the blade and extending laterally outside the cutting edges of the blade substantially parallel therewith, and means for mounting said guard on the frame for adjustment toward and from the blade to vary the thickness of the slice, said guard having an end portion thereof of substantially less width than the blade for access of said blade at said end portion to a bone or other object for slicing thereto.

3. A slicing knife comprising an elongated blade, a guard extending lengthwise of said blade, means mounting said guard in spaced relation to the blade with an edge portion of the guard laterally overlapping the adjacent edge of the blade, said guard being perforated along the edge portion thereof for visibility therethrough to the edge of the blade.

4. A slicing knife comprising an elongated frame, a blade extending lengthwise of the frame and supported thereby, a guard extending lengthwise of the blade, means mounting said guard on the frame for transverse movement relative to the blade, and a leaf spring connected between said mounting means and the guard tending to move said guard to a central position relative to the blade.

LOUIS H. REZOS.